(12) United States Patent
Genetski et al.

(10) Patent No.: US 8,108,289 B2
(45) Date of Patent: Jan. 31, 2012

(54) MARKET DATA RECOVERY

(75) Inventors: Dennis Genetski, Porter, IN (US); Vijay Menon, Chicago, IL (US); Matt Simpson, Wheaton, IL (US); Fred Malabre, Aurora, IL (US); Sreenivas Achanta, Aurora, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 481 days.

(21) Appl. No.: 11/776,323

(22) Filed: Jul. 11, 2007

(65) Prior Publication Data

US 2009/0019305 A1 Jan. 15, 2009

Related U.S. Application Data

(60) Provisional application No. 60/948,666, filed on Jul. 9, 2007.

(51) Int. Cl.
*G06Q 40/00* (2006.01)
(52) U.S. Cl. .............................. 705/37; 705/36 R; 705/35
(58) Field of Classification Search .................... 705/35, 705/37
See application file for complete search history.

(56) References Cited

U.S. PATENT DOCUMENTS

| | | | | |
|---|---|---|---|---|
| 5,270,922 A | * | 12/1993 | Higgins | 705/37 |
| 5,764,886 A | * | 6/1998 | Danielson et al. | 714/47.2 |
| 5,987,432 A | * | 11/1999 | Zusman et al. | 705/35 |
| 2002/0191614 A1 | | 12/2002 | Ido et al. | |
| 2003/0225674 A1 | | 12/2003 | Hughes, Jr. et al. | |
| 2007/0110439 A1 | | 5/2007 | Beshai et al. | |
| 2007/0124419 A1 | | 5/2007 | Howorka et al. | |
| 2008/0114938 A1 | * | 5/2008 | Borgendale | 711/118 |

OTHER PUBLICATIONS

Market Data Organization WG, Minutes from meeting held on Wednesday, Jun. 21, 2006 at 9:00 a.m. EST, 5 pages.
PCT International Search Report, PCT/US 08/69381, mailed Aug. 29, 2008, 9 pages.
PCT International Preliminary Report on Patentability, PCT/US2008/069381, mailed Jan. 21, 2010, 6 pages.

* cited by examiner

*Primary Examiner* — Lindsay M Maguire
*Assistant Examiner* — James Vezeris
(74) *Attorney, Agent, or Firm* — Banner & Witcoff, Ltd.

(57) ABSTRACT

Networks, systems and methods for recovering data messages from a market data stream and for building a book for a financial instrument are disclosed. An out-of-band data stream related to an as-of state of the market for one or more financial instruments is distributed parallel to a stream of market data for the financial instrument. The as-of data stream is referenced to the financial according to a unique identifier of the messages of the market data stream. The as-of data for a financial instrument may be provided at periodic rate that may be varied according to one or more factors.

10 Claims, 3 Drawing Sheets

MARKET DATA RECOVERY

This application claims priority to U.S. Provisional Application No. 60/948,666, entitled "Market Data Recovery" filed Jul. 9, 2007, the disclosures of which is expressly incorporated herein by reference in its entirety.

TECHNICAL FIELD

The present invention relates to distribution of data, and particularly to recovery of streaming market data.

DESCRIPTION OF RELATED ART

Financial data, often referred to as market data, is typically distributed to a vast number of recipients. The market data may be distributed or transmitted as a constant stream of consecutive messages. The consecutive messages may include information related to changes in the market for a financial instrument or investing vehicle, such as such as securities, commodities, equities derivatives and the like. The market data may relate to new orders entering a market, pending orders in the market, cancelled orders, executed transactions, and other data related to market conditions. The messages may also include information from which a current state of the market, or portion of the market, may be derived.

The market data may be distributed using a data transmission protocol. One type of protocol, referred to as User Datagram Protocol (UDP) multicast architecture, uses a multi-feed efficient message delivery of market data messages. In the market data applications, streams of data are provided from an originator, such as an exchange, to recipients of the market data over a dedicated market data pipe, such as a T1 line. The pipe may include data transmissions for one or more financial instruments or investing vehicles. The messages are sent as streams of appropriately sized consecutive packets or messages that may be determined by a maximum transmission unit (MTU) size of a data link layer of the network. The resulting packets are delivered through to a receiving module at a recipient end. Each packet may have a sequence number that may be used to identify each message received at the recipient and the order in which the messages are processed at the receiving end.

The module at the recipient end may recognize when transmitted messages may not have been received. Lost messages or gaps in the stream of data messages may be identified from the sequence numbers of the received messages. Lost messages may be recovered through a process where the recipient identifies lost messages to the sender. After receiving requests for lost messages, the sender may aggregate requests in a retransmission.

The retransmission of the data may be provided using a Transmission Control Protocol of the Internet Protocol suite, (TCP/IP) where the requesters listen to the retransmitted messaged for the missing data. For example, if recipient 1 has not received messages 20-50 and recipient 2 has not received 48-52, the sender may aggregate the two requests and re-transmit messages 20-52. Recipient 2 will need to listen to all messages before receiving the desired replacement transmission.

In another example, a new-comer to the market may not be able to identify the current state of the market because a current market data stream does not include a reference point for the changes in the market reflected in the market data stream.

Therefore, there exists a need for systems, methods and/or apparatuses to address the above concerns.

BRIEF SUMMARY

By way of introduction, market data recovery systems, apparatuses, and/or methods may be achieved by one or more devices, networks, and/or processes for distributing, communicating, transmitting, broadcasting, multicasting, storing, submitting, receiving, circulating, entering, managing, administering, and/or presenting market data.

The market data recovery system, method and/or apparatus addresses the impact of missing data messages in a received market data stream, and techniques for recovering the state of the market, or the "Order Book" in any particular instrument when messages in a data stream may have been missed and/or disaster recovery scenarios. The invention may allow rebuilding of the state of the market without having received all market data messages in a single market data feed. The market data recovery system, method and/or apparatus may also allow late joiners to a market to rebuild a book where price updates were previously provided in a market and to make an accurate assessment of the current state of the market.

The foregoing summary is provided only by way of introduction. The features and advantages of aspects of the invention may be realized and obtained by the instrumentalities and combinations pointed out in one or more of the claims. Nothing in this section should be taken as a limitation on the claims. Additional features and advantages will be set forth in the description that follows, and in part will be obvious from the description, or may be learned by practice of aspects of the invention.

BRIEF DESCRIPTION OF THE DRAWINGS

Examples of market data recovery systems are described with reference to the accompanying drawings, in which components, features and integral parts that correspond to one another each have the same or similar reference number, wherein.

DETAILED DESCRIPTION

Market data recovery systems in accordance with aspects of the invention may take physical form in certain parts and steps, embodiments of which will be described in detail in the following description and illustrated in the accompanying drawings that form a part hereof. Market data recovery systems, methods and apparatuses may be achieved in many different forms, formats, and designs and should not be construed as limited to the exemplary embodiments set forth herein.

A match engine may provide as output, among other things, data associated with market events and conditions. The output from the match engine may be provided to a market data routing module including a market data router. The market data routing module may be one or more controllers, processors, servers, gateways, computer combinations thereof and the like. The market data router may output at least one market data channel. The market data channel distributes market data generally in the form of streaming, or a substantially constant stream of data messages. The market data channel may distribute the information for one or more financial instruments or investment vehicles.

The out of band channel market data recovery module provides data related to a state of the book for an instrument or other investment vehicle. The out of band channel resides outside of the actual market data stream channel. The out of band channel market data recovery module provides the as-of state of the book for a specified point in time. The state of the book is periodically updated and resent or retransmitted at a predetermined or configurable rate. The rate may be adjusted on one or more factors, including the volume or relative for the product, the time of day, volume for other products and the like.

The data may include an as-of sequence number, which may be used to provide a reference point to the streaming data distributed on the market data channel. The as-of data and sequence number provides information related to the state of the market at a point in time and may correlate to the sequence number of the data provided on the market data channel. A recipient of the data on the market data channel may be able to rebuild all or a portion of a book by using the as-of data from the out-of-band channel with the streaming data from the market data channel.

Figure 1:
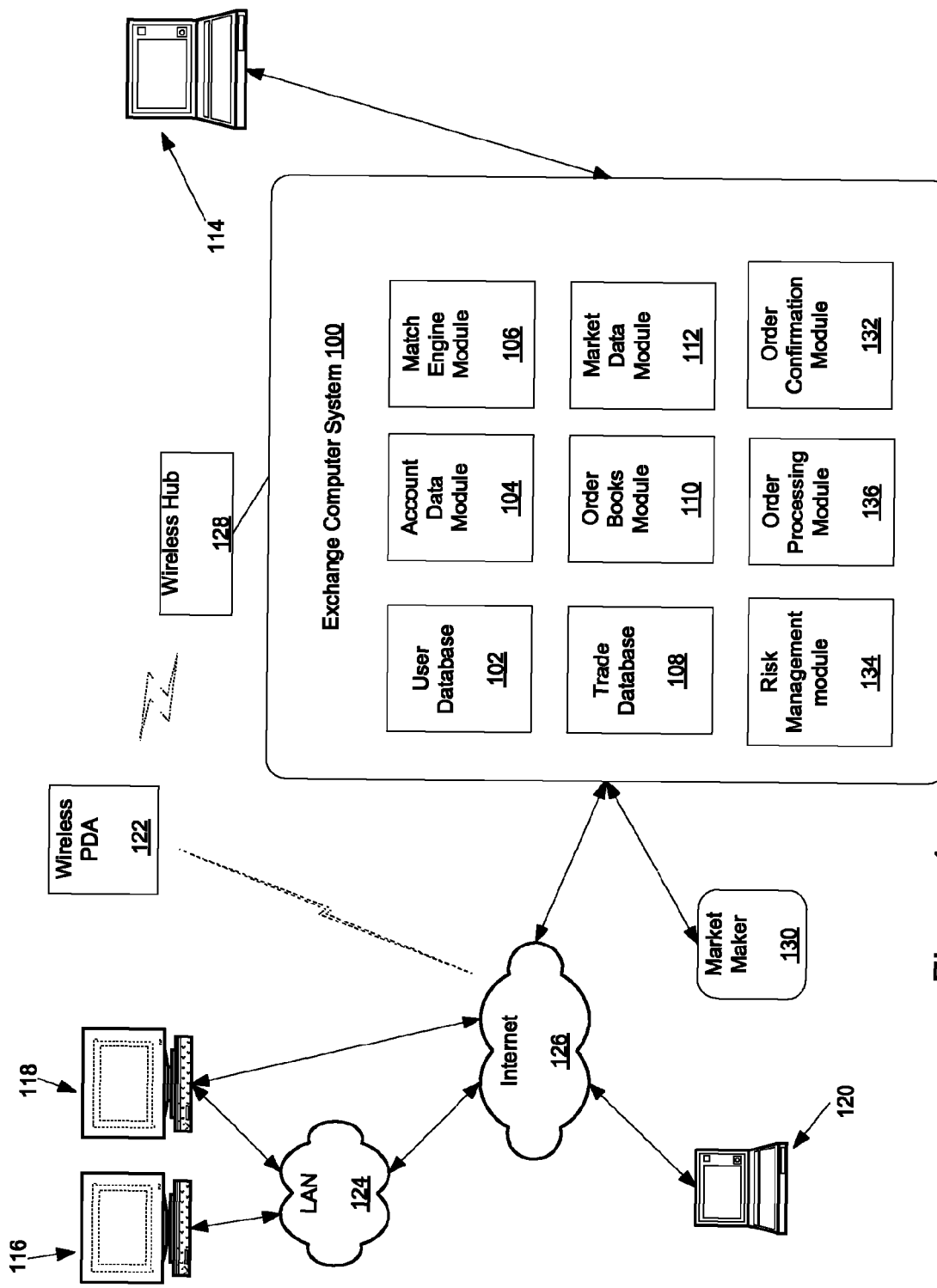
FIG. 1 shows a computerized system that may be used with an implementation of market data recovery in accordance with aspects of the invention.

Referring to FIG. 1, various aspects of the present invention may be implemented with computer devices and networks configured to allow users to exchange trading information. In illustrative embodiments, systems, methods and apparatuses for administering, communicating, managing, placing, entering, receiving, matching, clearing, presenting, listing and/or confirming orders for bundled financial instruments may be achieved in many different forms, formats, and designs. Embodiments may take the form of one or more devices, systems, distributed networks, data processing systems, and/or processes and should not be construed as limited to the illustrative embodiments set forth herein. An illustrative trading network environment for implementing trading systems and methods is shown in FIG. 1.

An exchange computer system 100 receives orders and transmits market data related to orders, trades and related information. Exchange computer system 100 may be implemented with one or more mainframes, servers, gateways, controllers, desktops or other computers. The exchange computer system 100 may include one or more modules, databases, and other components, such as those illustrated in FIG. 1. An electronic trading system, such as the Globex® trading system, may be associated with an exchange 100. In such an embodiment, the electronic trading system includes a combination of globally distributed computers, controllers, servers, networks, gateways, routers, databases, memory, and other electronic data processing and routing devices.

The trading system may include a trading system interface having devices configured to route incoming messages to an appropriate devices associated with the trading system. The trading system interface may include computers, controllers, networks, gateways, routers and other electronic data processing and routing devices. Orders that are placed with or submitted to the trading system are received at the trading system interface. The trading system interface routes the order to an appropriate device.

A match engine module 106 may match bid and offer prices for orders configured in accordance with aspects of the invention. Match engine module 106 may be implemented with software that executes one or more algorithms for matching bids and offers for bundled financial instruments in accordance with aspects of the invention. The match engine module and trading system interface may be separate and distinct modules or component or may be unitary parts. Match engine module may be configured to match orders submitted to the trading system. The match engine module may match orders according to currently known or later developed trade matching practices and processes. In an embodiment, bids and orders are matched on price, at on a FIFO basis. The matching algorithm also may match orders on a pro-rata basis or combination of FIFO and pro rata basis. Other processes and/or matching processes may also be employed.

Furthermore, an order book module 110 may be included to compute or otherwise determine current bid and offer prices. The order book module 110 may be configured to calculate the price of a bundled financial instrument based on an average price of the plurality of short-term financial instruments from the prior trading day's close. The average may be a weighted to reflect the percentage of the total bundle that a particular financial instrument constitutes. Moreover, a trade database 108 may be included to store information identifying trades and descriptions of trades. In particular, a trade database may store information identifying or associated with the time that an order was executed and the contract price. The trade database 108 may also comprise a storage device configured to store at least part of the orders submitted by electronic devices operated by traders (and/or other users). In addition, an order confirmation module 132 may be configured to provide a confirmation message when the match engine module 106 finds a match for an order and the order is subsequently executed. The confirmation message may, in some embodiments, be an e-mail message to a trader, an electronic notification in one of various formats, or any other form of generating a notification of an order execution.

A market data module 112 may be included to collect market data and prepare the data for transmission to users. In addition, a risk management module 134 may be included to compute and determine a user's risk utilization in relation to the user's defined risk thresholds. An order processing module 136 may be included to receive data associated with an order for a financial instrument. The module 136 may decompose delta based and bulk order types for processing by order book module 110 and match engine module 106. The order processing module 136 may be configured to process the data associated with the orders for financial instruments.

A user database 102 may include information identifying traders and other users of exchange computer system 100. Such information may include user names and passwords. A trader operating an electronic device (e.g., computer devices 114, 116, 118, 120 and 122) interacting with the exchange 100 may be authenticated against user names and passwords stored in the user database 112. Furthermore, an account data module 104 may process account information that may be used during trades. The account information may be specific to the particular trader (or user) of an electronic device interacting with the exchange 100.

The trading network environment shown in FIG. 1 includes computer (i.e., electronic) devices 114, 116, 118, 120 and 122. The computer devices 114, 116, 118, 120 and 122 may include one or more central processors, or controllers, that control the overall operation of the computer. The computer devices 114, 116, 118, 120 and 122 may include one or more system buses that connect the central processor to one or more components, such as a network card or modem. The computer devices 114, 116, 118, 120 and 122 may also include interface units and drives for reading and writing data or files. Depending on the type of computer device, a user can interact with the computer with a keyboard, pointing device, microphone, pen device or other input device. Computer device 114 is shown communicatively connected to exchange computer system 100. Exchange computer system 100 and computer device 114 may be connected via a T1 line, a common local area network (LAN) a wireless communication device or any other mechanism for communicatively connecting computer devices.

Computer (i.e., electronic) devices 116 and 118 are coupled to a local area network ("LAN") 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a wireless PDA 122 includes mobile telephones and other devices that communicate with a network via radio waves. FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for communicatively connecting a computer device to the Internet.

One or more market makers 130 may maintain a market by providing substantially constant bid and offer prices for a financial instrument, such as a derivative or security, to exchange computer system 100. Exchange computer system 100 may also exchange information with other trade engines. Numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. Embodiments also may take the form of electronic hardware, computer software, firmware, including object and/or source code, and/or combinations thereof. Embodiment may be stored on computer-readable media installed on, deployed by, resident on, invoked by and/or used by one or more data processors, controllers, computers, clients, servers, gateways, networks of computers, and/or any combinations thereof. The computers, servers, gateways, may have one or more controllers configured to execute instructions embodied as computer software. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

An embodiment may include software stored and executed on an electronic device such as one or more traders terminals, connected to a match server having electronic components configured to carry out instructions according to a computer program stored on a computer-readable storage medium, such as a memory, hard disk, CD-ROM, optical storage device, magnetic storage device and/or combinations thereof to match orders for bundled financial instruments. The electronic device may be a computing device having a programmable controller or processor. For example the electronic device may be a personal computer, laptop or handheld computer, tablet pc and like computing devices having a user interface. The electronic device may be a dedicated function device such as personal communications device, a portable or desktop telephone, a personal digital assistant ("PDA"), remote control device, personal digital media system and similar electronic devices.

Additional servers, computers, handheld devices, personal digital assistants, telephones and other devices may also be connected to exchange computer system 100. Moreover, the topology shown in FIG. 1 is merely an example and that the components shown in FIG. 1 may be connected by numerous alternative topologies.

Aspects of market data recovery may be implemented with electronic computing devices and/or networks (e.g., Internet, telecommunication networks, local area networks, wide area networks, private proprietary networks, etc.). The electronic computing devices may be configured to allow users to exchange and receive trading information. An illustrative trading network environment for receiving, processing, and restoring market data for financial instruments and methods thereof in accordance with various aspects of the invention are shown in FIG. 1.

Figure 2:
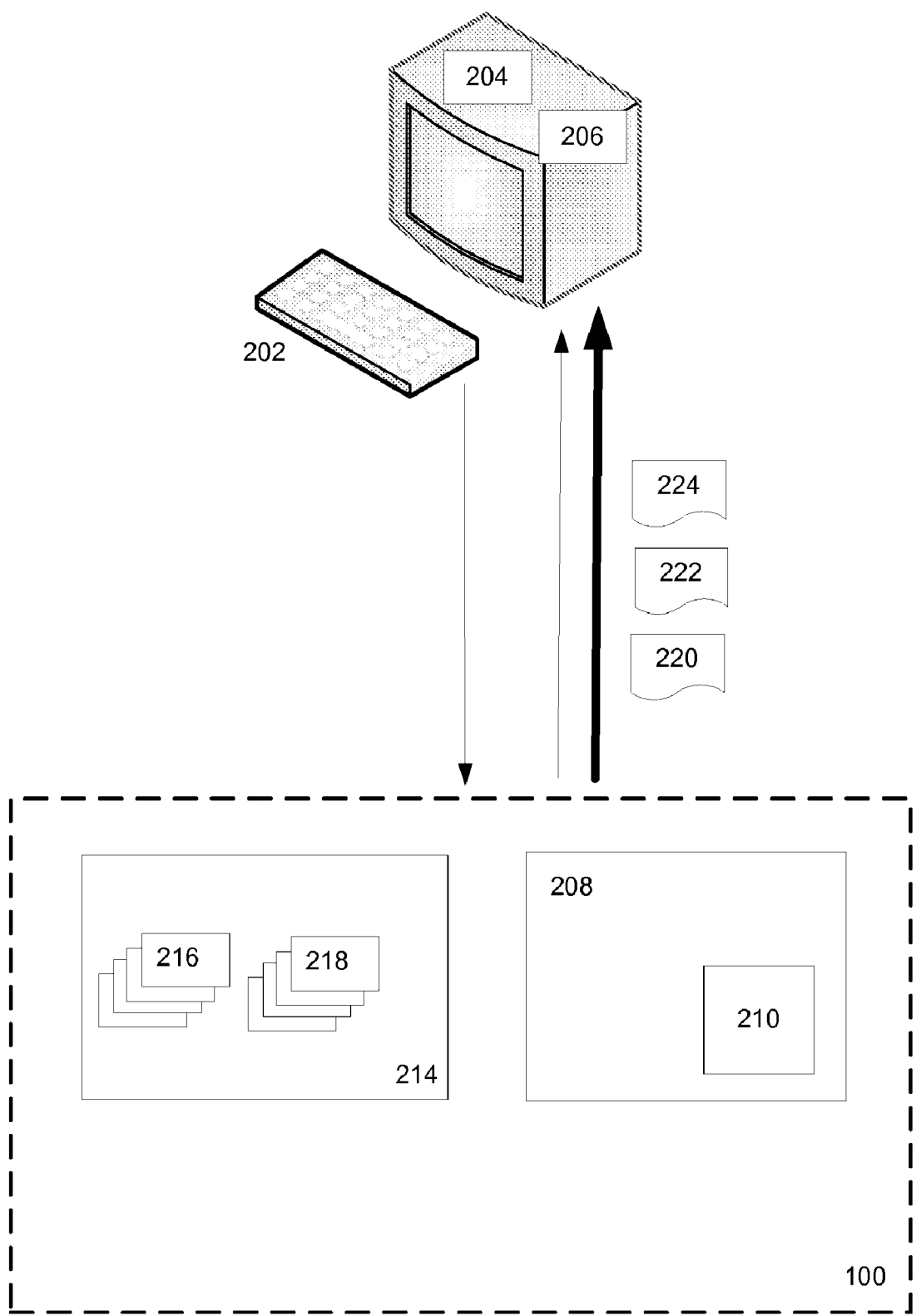
FIG. 2 shows a system for distributing market data in accordance with aspects of the invention.

FIG. 2 illustrates a system for distributing market data in accordance with various aspects of the invention. A market data routing module 208 comprising a market data router 210 is communicatively coupled with a match engine (not shown). The market data router 210 receives a market data feed from the match engine 206. The market data router 210 distributes the data stream on a market data channel to a remote trading system 202. In one example, the market data may be distributed in a substantially constant stream of consecutive data messages. The market data stream may be distributed within the electronic trading exchange 100 and/or outside of the electronic trading exchange 100.

In the illustrative embodiment of FIG. 2, the market data stream comprises bid and ask prices of order for a financial instrument. Each data message in the market data stream may be identified by a unique a sequence number tag. The messages may also include other identifiers known to those of ordinary skill in the art. The sequence number provides a mechanism for recreating the market data stream should the remote trading system 202 become disconnected from the exchange 100.

In accordance with aspects of the invention, a snapshot message may comprise multiple levels (e.g., five levels deep) of bid and ask prices for a particular financial instrument. The snapshot message may also include the quantity, instrument symbol (e.g., GEM7, etc.) and unique sequence identifier. A market data recovery module (e.g., an out-of-band (OOB) market data recovery module 214) may generate snapshot messages 216 using market data, and distribute the snapshot message 216 to a remote system 202. The data recovery module 214 may transmit out-of-band for numerous reasons, including, but not limited to reducing latency.

In addition, the OOB data recovery module 214 may transmit other types of messages to a remote system 202. For example, an out of band channel may comprise incremental market data messages 220, snapshot messages 222, and/or dictionary messages 224. Dictionary messages may be used to disseminate instrument definitions (e.g., similar to RLC MO/MU formatted messages known to those of skill in the art). The OOB data recovery module 214 may transmit message via one or more OOB channels using multicasting technology. One skilled in the art will appreciate that multicasting and UDP technologies may be useful in distributing messages in the described architectures.

The snapshot messages may be distributed using an as-of data channel. Such an as-of channel may periodically transmit data related to the state of a book. The as-of data channel may provide the data related to one or more books. The rate at which the as-of data is provided may be predetermined and may be variable based on one or more factors. A unique sequence identifier may be used to synchronize the in-band market data (e.g., the streaming market data) with the out-of-band data. The as-of data may be used in such a synchronization process.

In addition, in accordance with aspects of the invention, an order entry/receiving device 202 is disclosed comprising a memory 204 and a processor 206. The memory 204 may contain a computer-readable medium storing computer-executable instructions for execution by the processor 206. The computer-readable medium may contain instructions for performing one or more of the method steps described in this disclosure and any incorporated by reference. The instructions may be embodied, in one example, as computer software running on a personal computer behaving as an order entry/receiving device 202. The software may generate a graphical user interface for presentation on a visual display in order to permit a user to create an order and receive market and other data.

The order entry/receiving device 202 may comprise an order receiving component (not shown) configured to receive data (e.g., in-band data and out-of-band data) associated with a financial instrument. In one example, the order receiving component may be an electronic component (e.g., a modem, network card, input/output port) on device 202. Alternatively, the order receiving component may be a buffer in memory 204 for initially receiving incoming data. In another example, the order receiving component may be configured to register to receive data message for a particular financial instrument (e.g., out-of-band data for an order book in data recovery mode.) Furthermore, the device 202 may comprise an order storage component (e.g., memory 204) configured to store the data of the financial instrument. In one example the order storage component may be cache memory for caching incoming market data during recovery mode. In addition, the device 202 may comprise a book rebuilding component configured to rebuild the order book. In one example, the rebuilding component may be implemented as computer-executable instructions on a computer-readable medium that is capable of performing the rebuilding process, including (where appropriate) the various rebuilding approaches.

Figure 3:
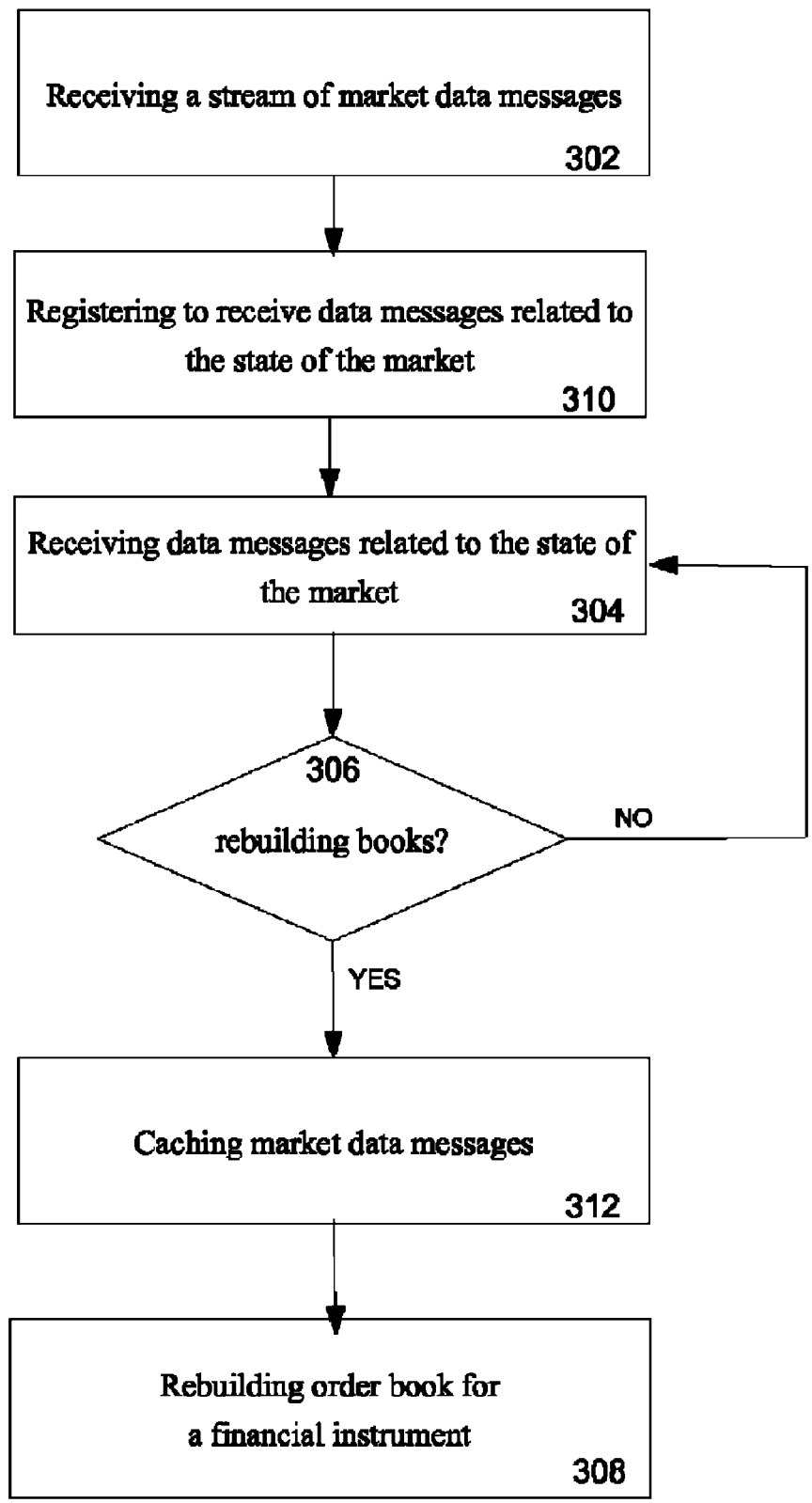
FIG. 3 shows a flow chart for a method for recovering market data in accordance with aspects of the invention.

FIG. 3 shows a flow chart for a method for recovering market data in accordance with aspects of the invention. In step 302, the trading system 202 may receive a substantially constant stream of consecutive data messages. Each data message may have a unique identifier and be associated with a market event for a financial instrument. In step 304, the trading system 202 may periodically receive a data messages related to the state of the market for the financial instrument. Moreover, the state of the market may be referenced to at least on unique identifier. In step 306, the trading system 202 may determine whether the order book requires rebuilding due to a connectivity failure with an exchange 100. If a rebuilding is desired, in step 308, the trading system 202 may rebuild the order book for the financial instrument according to the constant stream of consecutive data messages and the data messages related to the state of the market.

The rebuilding process may be performed using one or more approaches. For example, a natural refresh approach may be used to refresh the omitted market data in the appropriate order books. One of skill in the art will appreciate that a natural refresh approach may be desirable in certain circumstances. For instance, a natural refresh approach may not be desirable for illiquid financial instruments. In another example, a concurrent processing approach may be used to synchronize data messages received from an OOB market data recovery module with cached market data messages received from a market data routing module. The OOB messages and in-band messages may be synchronized using an as-of sequence number associated with a snapshot message. The snapshot message may be used to show the state of a book as of a certain sequence number.

Moreover, in such approaches a liveness criteria may be implemented to remove cached data messages (e.g., in-band market data message) that have become obsolete. As explained earlier, using the as-of sequence number, a snapshot message may inserted into the cached data stream at the appropriate position. As a result, cached data messages prior to the as-of sequence number associated with the snapshot can be dropped. Meanwhile data messages following the as-of sequence number may be applied to the order book as updates. The rebuilding approach used may be based on one or more predetermined criteria, such as increasing performance, decreasing processing time, reducing cache memory usage, etc. One of skill in the art will appreciate that one or more, or combination thereof, of the aforementioned approaches, and other approaches known to those of skill in the art, may be used in accordance with aspects of the invention.

In another example, the trading system 202 may register (in step 310) with an exchange 100 (or other entity capable of distributing the appropriate data) to receive messages related to the state of the market for the financial instrument (e.g., snapshot messages, etc.). The data messages may be sent out-of-band, and the trading system 202 may specifically request which out-of-band channel it desires. For example, the trading system 202 may register to receive that recovery data messages (e.g., snapshot messages, etc.) for a particular financial instrument or group of financial instruments out-of-band. As such, the bandwidth consumed and latency is more efficient. In addition, the trading system 202 may cache consecutive data messages in a cache in step 312. The consecutive data messages may be received as a substantially constant stream of market data.

Additional servers, computers, handheld devices, personal digital assistants, telephones and other devices may also be connected to exchange computer system 100. Moreover, the topology shown in FIG. 1 is merely an example and that the components shown in FIG. 1 may be connected by numerous alternative topologies. Embodiments in accordance with aspects of the invention may take the form of one or more devices, systems, distributed networks, data processing systems, processes, electronic hardware, computer software, firmware, including object and/or source code, and/or combinations thereof. Embodiments may be stored on computer-readable media installed on, deployed by, resident on, invoked by and/or used by one or more data processors, controllers, computers, clients, servers, gateways, networks of computers, and/or any combinations thereof. The computers, servers, gateways, may have one or more controllers configured to execute instructions embodied as computer software. Embodiment may be transmitted as a carrier signal from a first electronic device to another electronic device. The carrier signal, when received at an electronic device and executed by a processor, may provide a means for event triggered trading in accordance with aspects of the invention.

Various embodiments have been described and illustrated. However, the description and illustrations are by way of example only. Many more embodiments and implementations are possible within the scope of this invention and will be apparent to those of ordinary skill in the art. The various embodiments are not limited to the described environments, and can be applied to a wide variety of activities.

It is intended in the appended claims to cover such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

We claim:

1. A method for recovering streaming data comprising:
    receiving, at an electronic processor, a stream of data messages, each having a unique consecutive sequence identifier and associated with a market event for a financial instrument;
    periodically receiving, at the processor, data messages related to a state of the market for the financial instrument, the state of the market referencing at least one unique sequence identifier, where the data messages related to the state of the market comprise snapshot messages comprising multiple levels of bid and ask prices for the financial instrument; and
    rebuilding, using the processor and a book rebuilding component, a book in memory for the financial instrument according to the consecutive sequence identifiers of the data messages and the data messages related to the state of the market, where the data messages are in-band and the data messages related to the state of the market are out of band.

2. The method of claim 1, where the rebuilding includes a natural refresh approach.

3. The method of claim 1, where the rebuilding includes a concurrent processing approach.

4. The method of claim 1, where the rebuilding includes automatically selecting one of a natural refresh approach and a concurrent processing approach according to predetermined criteria.

5. The method of claim 1, comprising:
    registering to receive the data messages related to the state of the market for the financial instrument; and
    caching the data messages in a cache, the data messages received as a stream.

6. The method of claim 5, comprising removing the data messages in the cache if a data message fails a liveness criteria, where the rebuilding includes a concurrent processing approach.

7. A computer-readable medium comprising computer-executable instruction for:
    receiving a stream of data messages, each having a unique consecutive sequence identifier and associated with a market event for a financial instrument;
    periodically receiving data messages related to a state of the market for the financial instrument, the state of the market referencing at least one unique sequence identifier, where the data messages related to the state of the market comprise snapshot messages comprising multiple levels of bid and ask prices for the financial instrument; and
    rebuilding a book in memory for the financial instrument according to the consecutive sequence identifiers of the data messages and the data messages related to the state of the market, where the data messages are in-band and the data messages related to the state of the market are out of band.

8. An order trading system comprising:
    an electronic processor;
    a memory storing computer-executable instructions that when executed by the processor cause the system to perform steps comprising:
    receiving, using an order receiving component, data associated with a financial instrument;
    storing, using an order storage component, the data of the financial instrument; and
    rebuilding, using a book rebuilding component, an order book for the financial instrument using consecutive sequence identifiers of the data associated with the financial instrument;
    wherein the data received by the order receiving component comprises market data and out of band data associated with the financial instrument, where the out of band data comprises a snapshot message.

9. The system of claim 8, where the data received by the order receiving component is associated with a unique consecutive sequence identifier.

10. The system of claim 8, where the order receiving component is further configured to register to receive data associated with a predetermined financial instrument.

* * * * *